Aug. 11, 1953     O. J. HORGER     2,648,576
RAILWAY CAR AXLE BEARING

Filed Aug. 5, 1950     2 Sheets-Sheet 1

INVENTOR:
OSCAR J. HORGER
By Carr & Carr & Gravely
ATTORNEYS.

Aug. 11, 1953 — O. J. HORGER — 2,648,576
RAILWAY CAR AXLE BEARING
Filed Aug. 5, 1950 — 2 Sheets-Sheet 2

INVENTOR:
OSCAR J. HORGER

Patented Aug. 11, 1953

2,648,576

UNITED STATES PATENT OFFICE 2,648,576

RAILWAY CAR AXLE BEARING

Oscar J. Horger, Canton, Ohio, assignor to The Timken Roller Bearing Company, Canton, Ohio, a corporation of Ohio Application August 5, 1950, Serial No. 177,821

7 Claims. (Cl. 308—180)

This invention relates to improvements in railway car axle bearing assemblies wherein the innermost bearing of the assembly is provided with backing means formed and adapted to retain such bearing in a predetermined position relative to the car axle journal and, wherein the backing means is located so as to permit the utilization of a more closely fitted lubricant sealing member which will allow for a greater lubricant capacity in the bearing housing than has been available heretofore.

It is a principal object of the present invention to provide improved backing means for the innermost bearing of a railway car axle bearing assembly so that the journal portion of the car axle may have a contour in the zone of the innermost bearing which will reduce the number and character of the high stress points or zones along the length of the journal portion and thereby improve the useful life of the axle.

It is a further object of the present invention to provide an improved backing means for a railway car axle bearing so that a more efficient lubricant seal member may be employed in association with such bearing member, whereby an increase in the lubricant retaining capacity of the associated bearing housing can be had with attendant improvement in the useful life of the bearing assembly.

Figure 1:
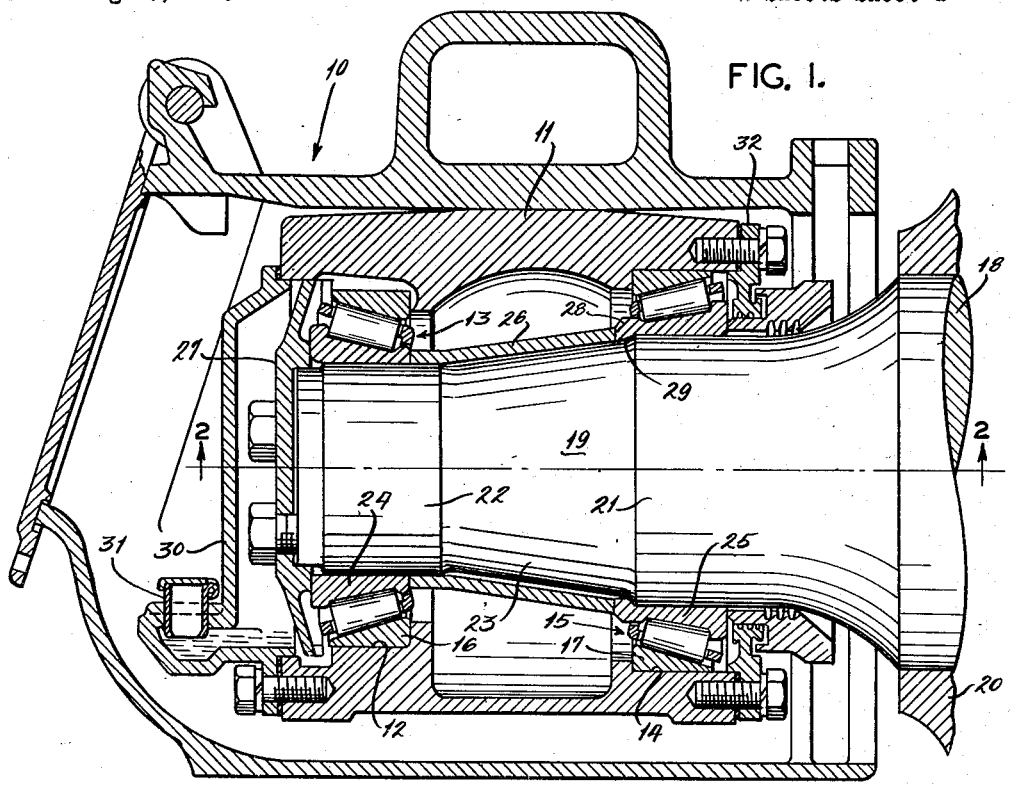
Figure 2:
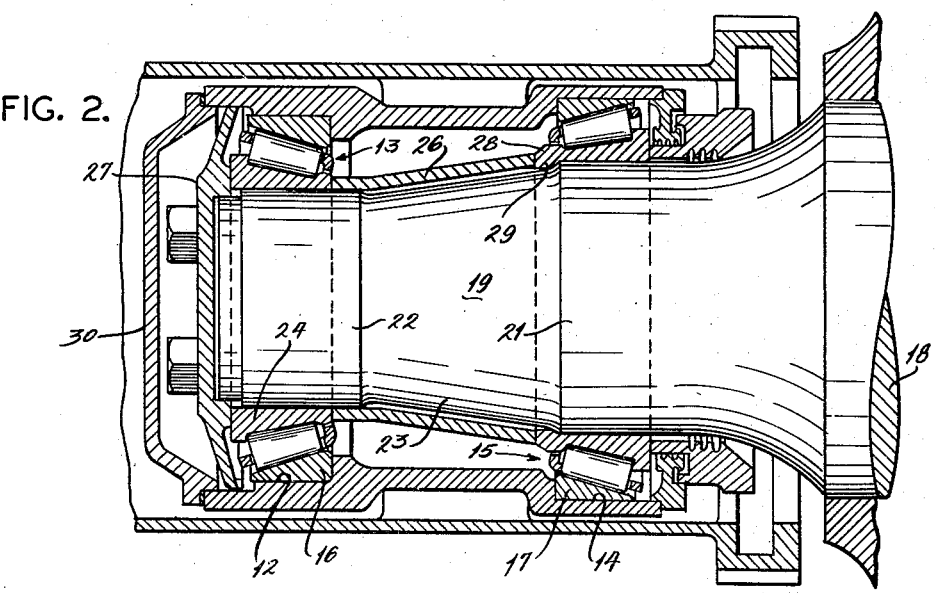
Figure 3:
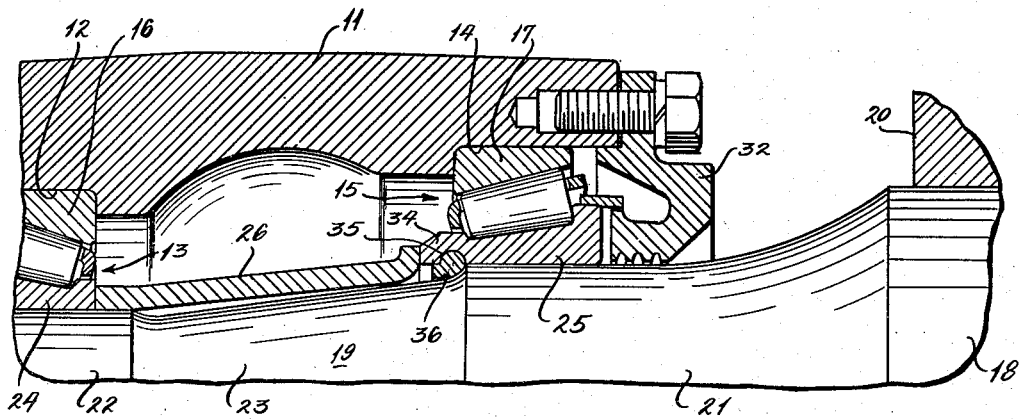
Figure 4:
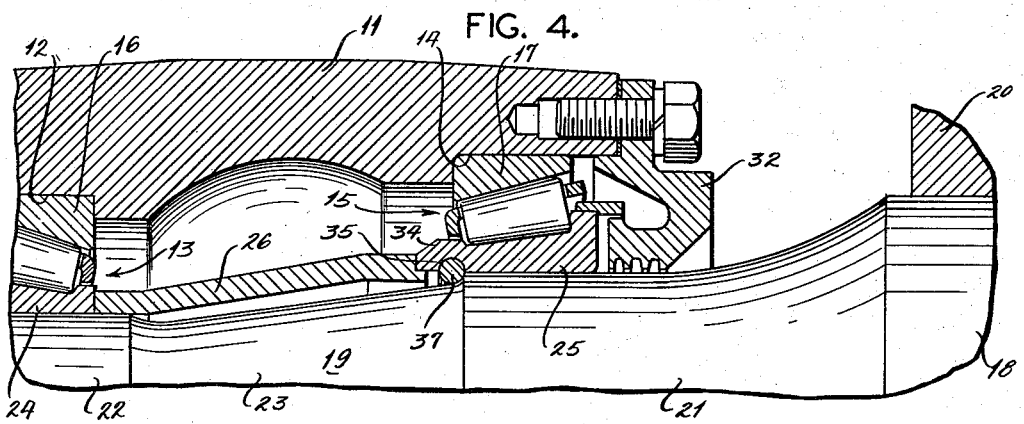
Figure 5:
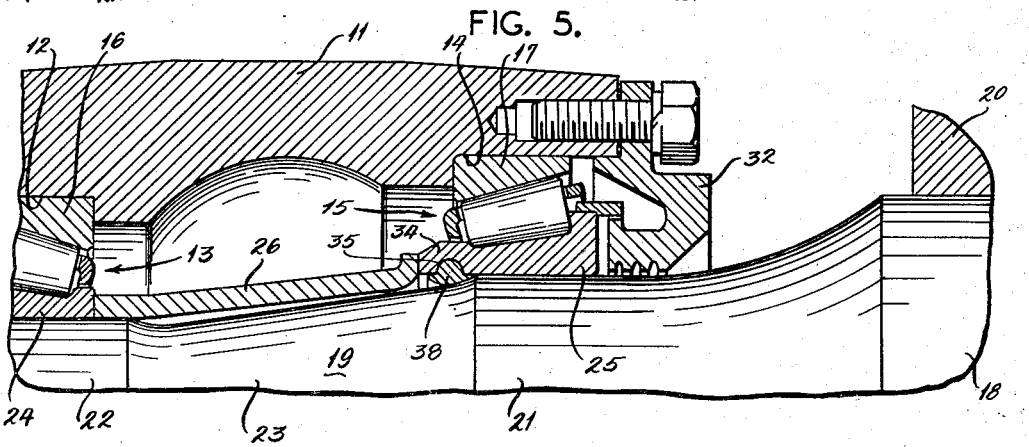

Further objects and advantages will be hereinafter pointed out and described in connection with certain presently preferred embodiments of the invention, reference being had to the accompanying drawing wherein:

Fig. 1 is a longitudinal sectional elevational view of the presently preferred bearing assembly illustrating the principal features of my present invention, Fig. 2 is a fragmentary sectional plan view of the bearing assembly disclosed in Fig. 1, the view of Fig. 2 being taken at line 2—2 in Fig. 1, Fig. 3 is a fragmentary sectional elevational view according to that of Fig. 1 but wherein a modification of the present invention is disclosed, Fig. 4 is a view similar to Fig. 3 and illustrates a further modification of the present invention and, Fig. 5 is a still further modification of my invention and wherein the view thereof is similar to Fig. 4.

Referring particularly to Figs. 1 and 2 for a detailed understanding of the preferred embodiment of my present invention, I have disclosed a more or less standard railway car axle journal box at 10, within which journal box there is suitably disposed a bearing housing 11 for the mounting of the bearings in operative position to receive the journal portion of the car axle.

The bearing housing 11 is suitably formed with an annular recess 12 to receive the outermost bearing 13 and is also formed with a similar annular recess 14 for the mounting of the innermost bearing 15. In each case, the bearings 13 and 15 have their outer raceways or cups 16 and 17 respectively fitted into the respective recesses 12 and 14 in such a manner that the bearings are retained in a predetermined spaced relation.

A railway car axle 18 has its journal portion 19 projecting outwardly of the hub 20 of the usual car wheel, and this journal portion 19 is turned or contoured to provide stepped bearing portions 21 and 22 axially separated or spaced by a tapered portion 23. In the present embodiment, the indicated stepped portions of the journal 19 are of different diameters and are received within the inner bearing members or cones 24 and 25 of the respective bearings 13 and 15. Thus the smaller diameter axle journal portion 22 is mounted within the cone 24 of the bearing 13 and the larger diameter journal portion 21 is received in the cone 25 of bearing 15. It is the usual practice to provide a spacer sleeve 26 between the bearing cones to maintain them in a desired predetermined spaced relation. The cone 24 of the outermost bearing 13 is held against outward axial displacement by means of a cap plate 27 suitably bolted or otherwise secured to the end face of the axle journal 19.

In accordance with the stated objects of the present invention, I have provided improved backing means associated with the innermost bearing 15 whereby the inner bearing member or cone 25 of the bearing may be retained against axial displacement inwardly of the axle journal portion 21. In the preferred form of my backing means, I have disclosed the cone 25 of the bearing 15 provided with an extension 28 projecting outwardly or in the direction of the spacer sleeve 26, and surrounding the tapered portion 23 of the axle journal 19 at a fillet zone closely adjacent the cylindrical stepped journal portion 21. This extension 28 of the cone is provided with or carries a member 29 which engages the fillet surface of the journal portion 21 and is made to conform with the contour of such surface. My presently preferred backing means or cone extension 28 having the member 29 thereon has the advantage that it is readily adaptable for engagement on a tapering surface ordinarily found on the axle journal and thereby eliminates the need for a special shoulder or other annular projection located inwardly of the bearing 15, as has been the usual practice heretofore. Accordingly, I have very desirably eliminated a high stress zone in the axle journal and have considerably simplified certain construction features of the bearing assembly.

In the present bearing assembly, the housing 11 is adapted to contain a body of lubricant for the respective bearing members 13 and 15. In this connection the outermost end zone of the bearing housing 11 is provided with a closure member 30 having the lubricant filler cup 31 disposed therein and opening to the chamber provided by the closure member 30 and within the lower portion of the bearing housing 11. The opposite or inner end of the bearing housing 11 is provided with a lubricant sealing member 32 which is suitably secured to the housing 11 and is adapted to fit closely about the axle journal portion 21 inwardly of the bearing 15. In the usual constructions heretofore prevailing, the bearing member 15 has been provided with a backing member necessarily disposed at the position herein shown occupied by the sealing member 32 and, therefore, the sealing member 32 required its sealing means to have an internal diameter which was limited by the minimum possible diameter afforded on the backing member for bearing 15. Accordingly, it is a feature of my present invention to be able to form the sealing member 32 with a substantially smaller internal diameter or an internal diameter which is substantially the same as the diameter of the axle journal portion with which it is associated. The reduction in the internal diameter of the sealing member 32 has the further advantage of permitting an increase in the level of lubricant contained in the bearing housing 11. This increase in lubricant level is a material advantage in that it improves the lubrication of the axle journal bearings.

With reference to Fig. 3 I have disclosed a modification of the present invention, wherein the cone 25 of the bearing 15 is provided with an extension 34 having an annular recess 35 formed therein in the overhanging portion of the extension. In cooperation with the recessed extension 34, I provide a ring member 36 which is carried by recess 35 of extension 34 and is adapted to engage an adjacent fillet surface of the tapering portion 23 of the axle journal 19. The ring 36 is provided with an external surface which conforms to the contour of the annular recess 35 in cone extension 34 and is further provided with an internal annular surface which has a contour conforming to the adjacent tapering or fillet surface of the axle journal portion 23.

A still further modification is disclosed in connection with Fig. 4, wherein the extension 34 of cone 25 is provided with an annular recess 35 similar to that disclosed in Fig. 3 so that the extension 34 can engage an annular ring element 37 and retain the ring 37 in abutment with the adjacent tapering or filleted surface of the axle journal portion 23. My invention may be further modified according to the disclosure of Fig. 5 wherein the annular ring element shown at 38 is provided with an outer surface portion conforming to the shape of the annular recess 35 formed in extension 34 of the inner cone element 25 of the bearing 15. The inner annular surface of the ring 38 is suitably flattened to a symmetrically extended surface contour which increases the area of contact or engagement on the adjacent filleted surface of the axle journal portion 23.

In any of the presently disclosed forms of the backing means provided on or for the cone 25 of the innermost bearing 15 it is, of course, most desirable to provide surface conformations on the extension 28 of Fig. 1 or on the several rings of Figs. 3 to 5 which give the largest contact area or has the largest radius of curvature. The preferred construction is disclosed in connection with Fig. 1, wherein the cone extension 28 is provided with an integral member 29. However, in certain cases it is more economical to provide an extension of the type shown at 34 in any of Figs. 3 to 5 and to provide a separate ring cooperating with the extension 34, as shown in these latter views. The utilization of a separate ring, in cooperation with the bearing cone extension, facilitates repair or replacement of parts of the bearing assembly and these rings may be solid or of the split type. This is a decided advantage over the construction in which the extension of the bearing cone is provided with an integral abutment member.

I have described my invention in connection with a preferred embodiment thereof and have also disclosed certain modifications thereof. However, I wish it understood that I claim all such modifications and equivalents that are or may fall within the scope and limitations of the appended claims.

What I claim is:

1. A car axle bearing assembly including a bearing housing, innermost and outermost roller bearings each having inner and outer roller supporting elements, said bearings being seated in said housing, an axle journal projecting into said housing and formed with axially spaced inner and outer zones for engagement by the inner members of the respective bearings, said axle journal having its inner bearing zone larger than its outer bearing zone such that the axle portion between said inner and outer zones is generally tapering, and an axially projecting extension on the inner element of said innermost bearing having a member engaging the tapering surface of said axle journal.

2. A car axle bearing assembly as defined by claim 1, and further in which said extension projects over the tapered axle surface and is formed with a recess adapted to engage a complementary surface on said member for retaining the latter in position engaging the tapering surface of said axle journal.

3. A car axle bearing assembly as defined by claim 1, and further in which said extension is formed with an annular recess adapted to receive said member, said member is formed with a surface substantially complementary to the tapering surface of said axle journal and a spacer is disposed between said bearings to fix the spacing of said bearings on said axle.

4. A car axle bearing assembly including a lubricant containing bearing housing, an axle journal projecting into said housing and being formed with an inner journal portion of larger diameter than an outer journal portion spaced therefrom by a tapering portion of the axle, outermost and innermost bearings engaging said outer journal portion and inner journal portion respectively, backing means for said innermost bearing engaging said axle to limit inward movement thereof, and means carried by said housing and closely surrounding said inner journal portion inwardly of said innermost bearing for sealing the housing against lubricant leakage therebeyond.

5. In a car axle bearing assembly, a bearing housing adapted to contain lubricant, a lubricant retaining closure for the outermost end of said housing, an axle formed with an enlarged inner journal portion located adjacent the innermost end of said housing and a tapering portion outwardly of said enlarged portion, a roller bearing including a cone carried on said enlarged inner journal portion of said axle and a cooperating cup seated in said housing, backing means integral with said bearing cone engaging the tapering portion of said axle for limiting inward movement of said bearing relative to said axle, and oil sealing means located at the innermost end of said housing closely embracing the axle adjacent the enlarged inner journal portion.

6. The car axle bearing assembly set forth in claim 5 wherein said oil sealing means includes a ring member carried by said housing having an inner diameter substantially the same as the diameter of said enlarged journal portion.

7. The car axle bearing assembly set forth in claim 5 wherein said oil sealing means includes a removable ring member on said housing, and said backing means includes an extension on said cone projecting over said tapering axle portion.

OSCAR J. HORGER.

References Cited in the file of this patent

UNITED STATES PATENTS

| Number | Name | Date |
|---|---|---|
| 556,678 | Kefuss | Mar. 17, 1896 |
| 939,055 | Michaud | Nov. 2, 1909 |
| 1,165,594 | Hani | Dec. 28, 1915 |
| 1,194,917 | Wright | Aug. 15, 1916 |
| 1,401,141 | Danielsson | Dec. 27, 1921 |
| 2,118,760 | Ernst | May 24, 1938 |
| 2,195,794 | Weckstein | Apr. 2, 1940 |
| 2,418,398 | Cottrell | Apr. 1, 1947 |

FOREIGN PATENTS

| Number | Country | Date |
|---|---|---|
| 583,295 | France | Jan. 9, 1925 |